(12) United States Patent
Steen et al.

(10) Patent No.: US 7,223,204 B2
(45) Date of Patent: May 29, 2007

(54) METHOD AND SYSTEM FOR AUTOMATIC FREEWHEELING OF VEHICLE

(75) Inventors: Marcus Steen, Angered (SE); Lars Karlsson, Göteborg (SE); Sixten Berglund, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 11/463,601

(22) Filed: Aug. 10, 2006

(65) Prior Publication Data

US 2006/0293824 A1 Dec. 28, 2006

Related U.S. Application Data

(63) Continuation of application No. PCT/SE2005/000257, filed on Feb. 22, 2005.

(30) Foreign Application Priority Data

Mar. 9, 2004 (SE) ................................. 0400605

(51) Int. Cl.
- F16H 59/60 (2006.01)
- F16H 59/62 (2006.01)
- B60T 8/24 (2006.01)
- G05D 1/00 (2006.01)
- G06F 7/00 (2006.01)

(52) U.S. Cl. .......................... 477/97; 701/94

(58) Field of Classification Search .................. 477/97; 701/93–95
See application file for complete search history.

(56) References Cited

U.S. PATENT DOCUMENTS

| | | | | |
|---|---|---|---|---|
| 6,951,525 B2 * | 10/2005 | Ries-Mueller | ............... | 477/74 |
| 7,018,321 B2 * | 3/2006 | Claar et al. | ................... | 477/92 |
| 7,134,355 B2 * | 11/2006 | Eriksson et al. | .............. | 74/333 |

* cited by examiner

Primary Examiner—Tisha Lewis
(74) Attorney, Agent, or Firm—WRB-IP LLP

(57) ABSTRACT

A method and a system for automatic freewheeling of a vehicle, where in the vehicle is arranged a speed-lowering arrangement, including an engine, a wheel driven by the engine via an automated stage-geared gearbox, a gas pedal for regulating the driving torque of the engine, and a control unit. The control unit is arranged to, when the freewheel function is activated and in the presence of an input signal indicating that a predetermined vehicle speed limit is exceeded, to automatically deactivate the freewheel function and brake the vehicle with the speed lowering arrangement. The control unit is arranged to reactivate the freewheel function in the presence of an input signal indicating that the vehicle speed has fallen to close to the predetermined vehicle speed limit. The future progression of the vehicle may be simulated with a view to optimizing the freewheel function in terms of good fuel economy and/or increased comfort.

12 Claims, 3 Drawing Sheets

METHOD AND SYSTEM FOR AUTOMATIC FREEWHEELING OF VEHICLE

The present application is a continuation of International Application No. PCT/SE2005/000257, filed Feb. 22, 2005, which claims priority to SE 0400605-2, filed Mar. 9, 2004, both of which are incorporated by reference.

BACKGROUND AND SUMMARY

The present invention relates to a method and a system for automatically limiting the speed of a vehicle when freewheeling.

The present invention also relates to a computer program for executing such a method with a computer.

Automatic transmissions of the stage-geared gearbox type have become increasingly common in heavy-duty vehicles as microcomputer technology has continued to advance and has made it possible, with a control computer and a number of control elements, for example servo motors, to precision-control the engine speed, the connection and disconnection of an automated clutch between engine and gearbox and coupling members of the gearbox, relative to one another, so that smooth gearshift is always obtained at the correct rev speed. The advantage with this type of automatic gearbox compared with a traditional automatic gearbox constructed with planetary gear steps and with a hydrodynamic torque converter on the input side is firstly that, particularly as regards use in heavy vehicles, it is simpler and more robust and can be produced at substantially lower cost than the traditional automatic gearbox, and secondly that it has higher efficiency, which means the prospect of lower fuel consumption.

The automatic gearbox constructed from planetary gears usually has one-way couplings between the planetary gear steps, which, when the engine is in drive, lock in the automatic gear position for torque transmission from the engine to the drive wheels, but which, when torque is transmitted in the opposite direction, i.e. at zero throttle and with the vehicle in motion, disengage and cause the vehicle to freewheel without engine braking, which, by utilizing the kinetic energy of the vehicle, yields lower fuel consumption than if the engine is busy braking.

A corresponding freewheel function in automated stage-geared gearboxes is shown by Here, a freewheel function is obtained by putting a splitter gear disposed in the gearbox into its neutral position when a gas pedal disposed in the vehicle is located within a predetermined swivel angle range, which starts at a distance from the rest position of the pedal and extends over a slight angle within the total swivel angle of the pedal. When the driver wishes to change the driving condition from driving engine to allowing the vehicle to freewheel without engine braking, he lets up the gas pedal, so that it reaches the predetermined range when the drive from the engine is broken. If engine braking is required, he further releases the gas pedal, either fully or, in any event, to the point where it passes through the predetermined range within which disengagement occurs. With freewheeling technology according to W002/092378, the increase in speed of the vehicle when freewheeling can sometimes become excessive. In this case, the driver of the vehicle reduces the vehicle speed by activating the service brake and/or auxiliary brake of the vehicle. This is done manually and produces a somewhat jerky drive.

It is desirable to achieve an automatic freewheel function, in a vehicle with stage-geared automated gearbox, in which the risk of driving the vehicle at excessively high speed is reduced and a more comfortable drive is obtained, whilst, at the same time, the prospect is offered of improved fuel economy.

A method according to an aspect of the invention comprises a method for automatic freewheeling of a vehicle. In the vehicle are arranged speed-lowering means, at least one engine, at least one wheel driven by the engine via an automated stage-geared gearbox, a gas pedal for regulating the driving torque of the engine. The freewheeling is automatically activated in the presence of input signals indicating vehicle speed and gas pedal position within a predetermined swivel angle range of the gas pedal, which starts at a distance from the rest position of the gas pedal and extends over a slight angle within the total range of swivel of the gas pedal. The method comprises the steps whereby:
  the activated freewheel function is deactivated when a predetermined vehicle speed limit is exceeded,
  the vehicle is automatically braked with the speed-lowering means, whereupon
  the freewheel function is reactivated once the vehicle speed has fallen to close to equal to the predetermined vehicle speed limit.

An advantage associated with aspects of the method according to the invention is that the vehicle speed is automatically limited and, in connection therewith, that the freewheel function is automatically activated and deactivated according to requirement. The function according to aspects of the invention is integrated in the freewheel function. The driver enjoys a more relaxed and more comfortable drive. The fuel-saving benefit and other benefits of the freewheel function are enhanced by the present invention through reduced manual actuation of the freewheel function.

According to an aspect of the method according to the invention, the vehicle speed limit is predetermined in dependence on at least the prevailing road gradient of the road in which the vehicle is found. The vehicle speed limit can then be adjusted to different road gradients, so that the freewheel function and subsequent braking can be better realized.

According to a further aspect of the method according to the invention, an identification is made of the fact that the downhill slope on which the vehicle is traveling will end within a near future. This can be done with the aid, for example, of a GPS-based navigation system Positioning System) disposed in the vehicle. An alternative might be to predict the future topography of the vehicle with the aid of extrapolation. Once identification has been made that the downhill slope will end within a near future, the freewheel function is reactivated some time before the vehicle has fallen below the vehicle speed limit. The time is dependent, at least, on when the downhill slope is calculated to end.

This aspect of the invention can further extend the total freewheeling time and hence further reduce fuel consumption. By knowing in advance that the downhill slope will soon come to an end and that the vehicle will subsequently, without active braking, reduce its speed to below the predetermined speed limit, a reasonable breaching of the predetermined speed limit is allowed during the freewheeling. The freewheeling can therefore, in certain situations, continue to be activated in spite of the fact that the speed of the vehicle is somewhat higher than the predetermined speed limit.

A further aspect of the present invention also comprises a system for automatic freewheeling in a vehicle in which a control unit is arranged to, when the freewheel function is activated and in the presence of an input signal indicating that a predetermined vehicle speed limit is exceeded, to automatically deactivate the freewheel function and brake the vehicle with speed-lowering means, the control unit being arranged to reactivate the freewheel function in the presence of an input signal indicating that the vehicle speed has fallen to close to the predetermined vehicle speed limit.

The same advantages are obtained with aspects of the systems according to the invention as with aspects of the method according to the invention.

In one aspect of the system according to the invention, a system for setting the predetermined vehicle speed limit is coupled to the control unit. A vehicle speed can thereby be chosen, the breaching of which can initiate an automatic deactivation of the freewheeling. The device for setting the predetermined vehicle speed limit can be constituted by controls disposed on the vehicle instrument panel. According to a further embodiment of the system according to the invention, the vehicle speed limit can be determined in dependence on at least the prevailing road gradient of the road in which the vehicle is found. The vehicle speed limit can then be automatically adjusted by the device for setting the predetermined vehicle speed limit.

In a further aspect of the system according to the invention, the control unit is arranged to, during travel, at least on the basis of information on instantaneous vehicle speed, road gradient and gas pedal position, to continuously perform data simulations for the future progression of the vehicle with a view to optimizing the automatic activation and deactivation of the freewheeling with respect to a chosen criterion. A chosen criterion can be constituted by a demand for increased comfort and/or reduced fuel consumption. This embodiment allows the system according to the invention to take greater account of future topography in order better to be able to control the freewheel function. The activation and deactivation of the freewheel function with subsequent deceleration is thereby able to be further optimized.

BRIEF DESCRIPTION OF THE DRAWINGS FOR THE INVENTION

The present invention will be described in greater detail below with reference to the appended figures, in which.

DETAILED DESCRIPTION

Figure 1:
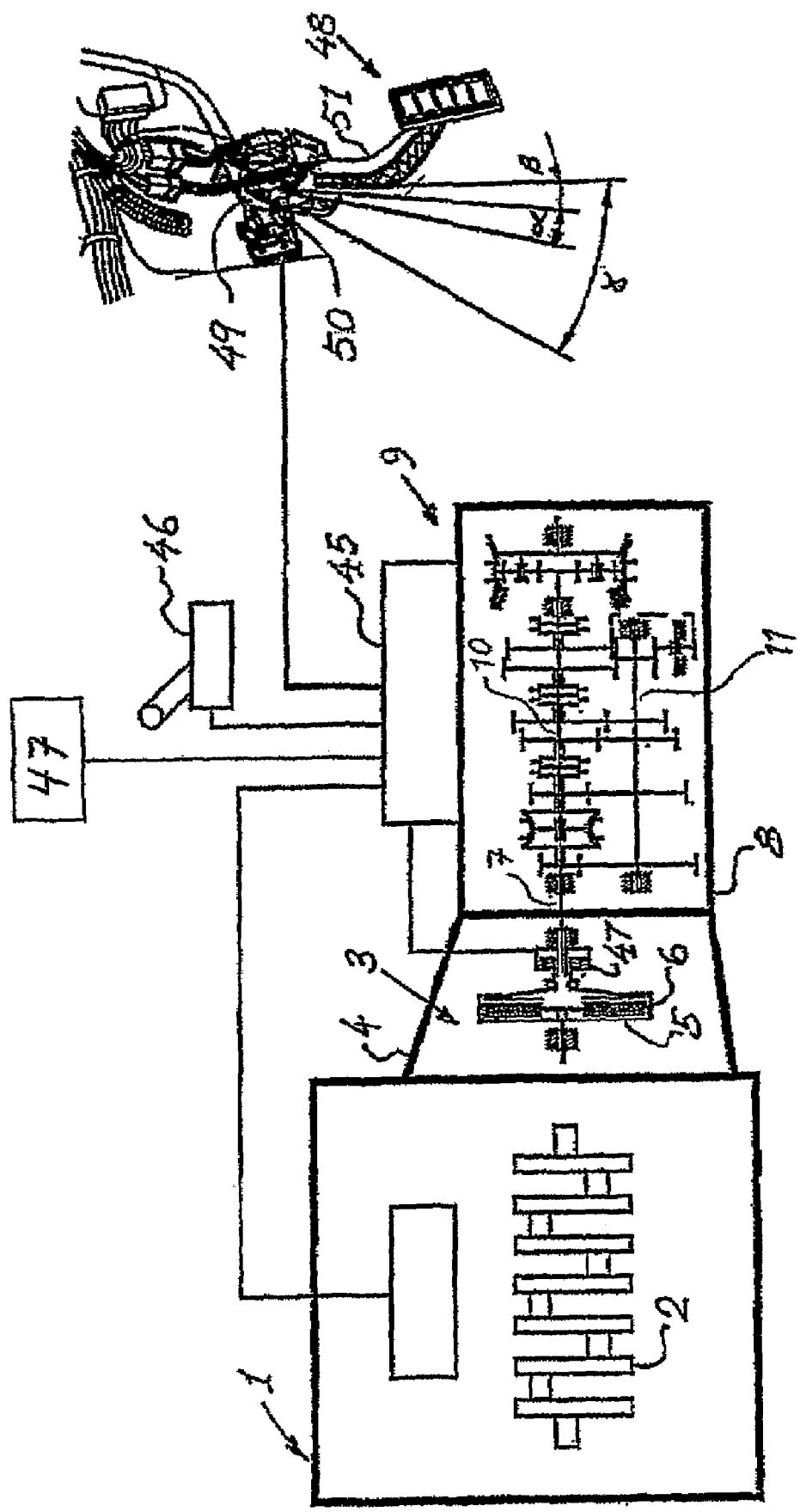
FIG. 1 is a diagrammatic representation of an embodiment of an installation for automatically limiting the speed of a vehicle when freewheeling according to an embodiment of the invention.

In FIG. 1, a six-cylinder internal combustion engine, for example a diesel engine, is denoted by 1, the crankshaft 2 of which is coupled to a single-disk dry plate clutch denoted generally by 3, which is enclosed in a clutch case 4. The crankshaft 2 is connected, non-rotatably, to an input shaft 7, which is rotatably mounted in the housing 8 of a gearbox denoted generally by 9. Also rotatably mounted in the housing 8 are a main shaft 10 and an intermediate shaft 11. A gear wheel is rotatably mounted on the input shaft 7 and can be locked on the shaft with the aid of a synchronizing device provided with a coupling sleeve, which is mounted in a non-rotatable but axially displaceable manner on a hub connected, non-rotatably, to the output shaft. With the aid of the coupling sleeve, a gear wheel rotatably mounted on the main shaft 10 can be locked relative to the input shaft 7. With the coupling sleeve in a middle position, both the gearwheels are disengaged from their respective shafts 7 and 10. The above mentioned gear wheels, together with the synchronizing device and the coupling sleeve, form a splitter gear.

Disposed in a rotationally secure manner on the intermediate shaft are further gear wheels, which each engage with a respective gear wheel rotatably mounted on the main shaft 10, which latter gear wheels can be locked on the main shaft with the aid of further coupling sleeves, which, in the illustrative embodiment shown, have no synchronizing devices. In the illustrative embodiment shown, a range gear step of the planetary gear type is also provided on the output end of the main shaft.

All coupling sleeves are displaceable with the aid of servo elements (not shown), which can be pneumatically operated piston cylinder devices of the type utilized in a transmission of the kind described above, which is marketed under the name The servo elements are electronically controlled by a control unit 45, comprising a microcomputer, in dependence on signals fed into the control unit and representing various engine and vehicle data, which minimally comprise engine speed, vehicle speed, the position of the gas pedal 48 of the vehicle, and, where appropriate, engine brake on-off, when an electronic gear selector 46, coupled to the control unit 45, is in its automatic gear position. The gas pedal position is obtained from an angle transmitter 49, which is coordinated with the pedal arm 51, pivotably mounted on a shaft 50, of the gas pedal 48. When the selector 46 is in the manual gearshift position, the gearshift is realized on the command of the driver via the gear selector 46. The control unit 45 also controls the fuel injection, i.e. the engine speed, in dependence on the gas pedal position and the air supply to a pneumatic piston-cylinder device 47, by which the clutch 3 is disengaged.

The control unit 45 is programmed so that the freewheel function is activated when the driver, with the vehicle in motion and with possible engine brake, for example an exhaust-gas regulator or compression brake, deactivated, lets up the gas pedal 48 to a position within the predefined swivel angle range, represented in FIG. 1 and denoted by $\alpha$, of the pedal arm 51, in which $\gamma$ denotes the total swivel angle of the pedal arm 51 and $\beta$ denotes a predefined angular range within which the engine does not inject fuel but within which disengagement does not take place, so that engine braking is obtainable. In the illustrative embodiment shown, the swivel angles $\alpha$ and $\beta$ are about 5° each within the total swivel angle of the pedal arm 51 of about 30° but the angle $\beta$ can be chosen, where appropriate, at 0°. This means that when the gas pedal is let up to a position below about 5° from its non-actuated rest position, the freewheel function is activated by the control unit 45 first controlling the engine speed, so that no torque is transmitted between the input shaft 7 of the transmission and the main shaft 10. The control unit 45 then transmits a signal to a servo element so that the input shaft 7 is disengaged from the intermediate shaft 11 by displacement of the coupling sleeve of the splitter gear into its neutral position, after which the engine is set to idling speed. The drive line is now separated and the vehicle is able to freewheel. In this case, therefore, a synchronized splitter gear is disengaged in order to achieve the freewheel function. Other means for disengaging the engine from the drive wheels of the vehicle can also be used to achieve the freewheel function.

According to the present invention, the control unit 45 is programmed so that the freewheel function is automatically deactivated when the speed of the vehicle exceeds a predetermined speed limit $v_{max}$. In the embodiment according to FIG. 1, a device is shown for setting the predetermined speed $v_{max}$, which device is denoted by 47. This device can be a separate control with selectable speed levels on the instrument panel of the vehicle, alternatively the device 47 can be a selectable setting function in a menu system belonging to, for example, the trip computer of the vehicle. In one embodiment of the invention, the device 47 can be a unit which automatically predetermines the speed in dependence on the road gradient on which the vehicle is found or will be found ("will be found" is more fully explained below). Various arrangements for measuring the road gradient are known per se.

Figure 2:
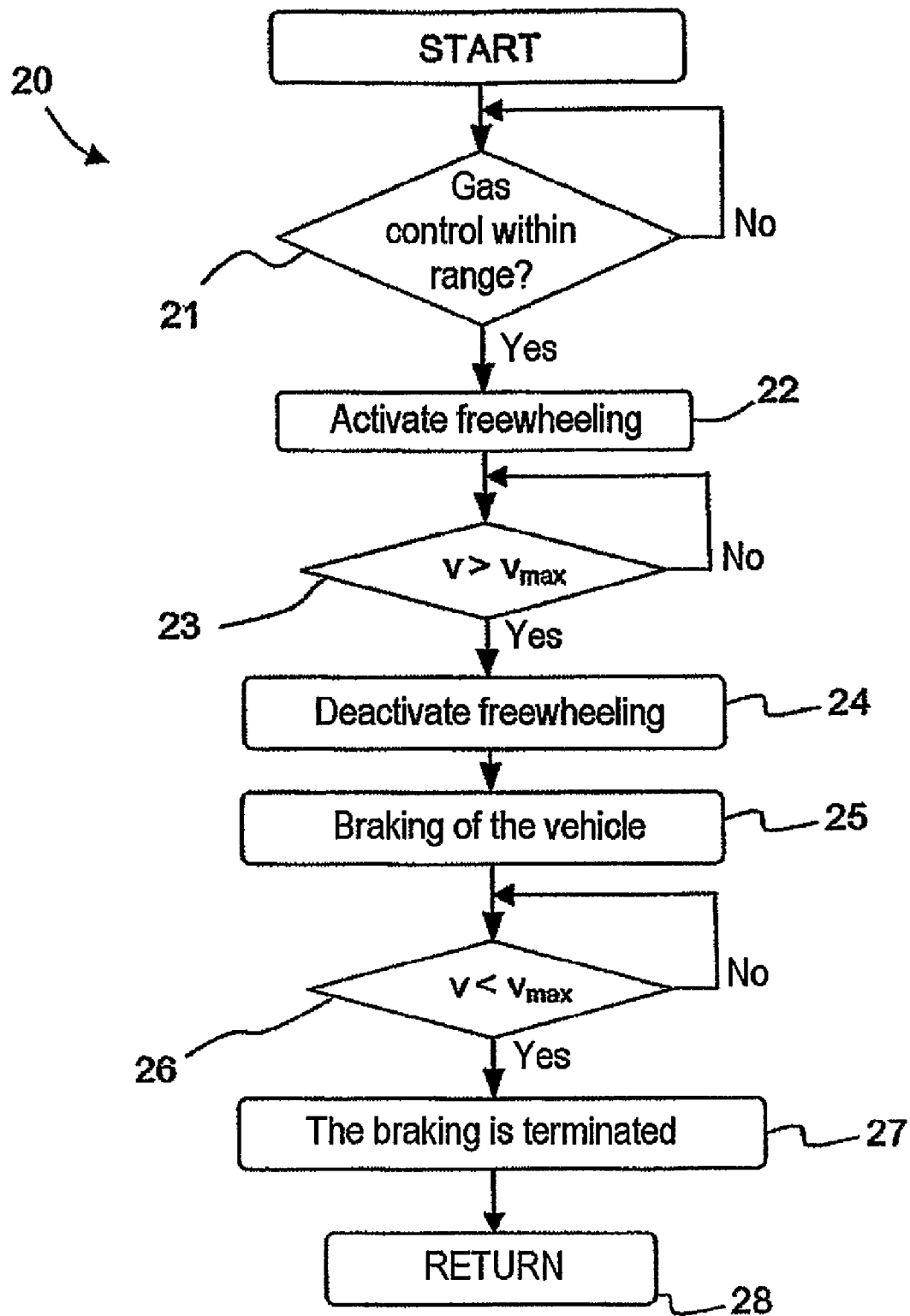
FIG. 2 is a control diagram according to an embodiment of the invention.

The control diagram 20 according to FIG. 2 shows in greater detail the various control steps performed by the control unit 45 according to one embodiment of the invention. In the step 21, the control unit 45 detects whether the pedal arm 51 is within the swivel angle range a or not. If it is established that the pedal arm 51 is outside the swivel angle range α, then the freewheel function is not activated. The control unit 45 continuously detects the position of the pedal arm 51. If it is established that the pedal arm 51 is inside the swivel angle range α, then the freewheel function is activated according to the disengagement of, for example, the splitter gear. This is done according to step 22. If the freewheel function is activated, the instantaneous speed v of the vehicle is compared in step 23 with the predetermined speed According to this embodiment, the control unit 45 performs this comparison continuously as long as the freewheel function is engaged. According to the illustrative embodiment shown in FIG. 2, the control unit 45 activates the freewheel function in step 24 if the instantaneous speed v of the vehicle exceeds the predetermined speed $v_{max}$ whereupon the control unit 45, according to the next step 25, brakes the vehicle by, for example, activating the brake system (not shown) of the vehicle. The brake system can be constituted by the service brake and/or auxiliary brake of the vehicle, in which the auxiliary brake can be a compression brake disposed in the engine or an exhaust brake disposed on the exhaust pipe. As an alternative or in addition thereto, the vehicle can be engine-braked, i.e. with the aid of the internal friction of the engine 1. In the following patent claims, the means comprises one or more of: engine brake (through the internal friction of the engine), service brake auxiliary brake. Engine braking, with the aid of the internal friction of the engine, can be realized in those situations where the braking force from the engine friction is calculated to be sufficient. In this case, the control unit chooses in the transmission 9 a gear which is tailored to the braking force. In the deactivation of the freewheel function, the control unit 45 firstly adjusts the engine speed to a rev speed which allows synchronization, and the gear which has previously been disengaged is then reengaged. The drive line is now reconnected and engine braking or driving is again possible. The control unit 45 compares, according to step 26, the instantaneous speed v of the vehicle with the predetermined speed $v_{max}$, the control unit 45 terminating the braking, in step 27, once the control unit 45 has established that the speed-lowering means have reduced the speed v of the vehicle to below Following completed braking of the vehicle, the control diagram 20 proceeds to the return step 28.

According to a further embodiment of the invention, an identification is made of the fact that the downhill slope on which the vehicle is traveling will end within a near future. This can preferably be done by the control unit 45 with the aid, for example, of a GPS-based navigation system Positioning System) disposed in the vehicle. With the aid of GPS and electronic maps in the navigation system of the vehicle, the control unit 45 acquires information on the instantaneous position of the vehicle and the surrounding topography. The control unit 45 registers the future topography continuously throughout the period the freewheel function is deactivated. Once the control unit 45 has identified that the downhill slope will soon end, the freewheel function is reactivated some time before the vehicle has fallen below the speed limit $v_{max}$, i.e. when the instantaneous speed v is close to and somewhat above the predetermined speed limit $v_{max}$. The time before the vehicle has fallen below the speed $v_{max}$ depends on when the downhill slope is calculated to end. This can be calculated through knowledge of the current speed v of the vehicle, expected deceleration and future topography. In a preferred embodiment of the invention, the control unit 45 takes account of how the topography looks after the downhill slope has come to an end, i.e. whether the downhill slope is followed by an uphill slope of a certain gradient or whether it is followed by an approximately flat road. Simulations in the control unit 45 allow the most fuel-efficient controlling of the freewheel function, for example, to be chosen.

In a further preferred embodiment, the system comprises an upper absolute maximum speed which lies a bit above $v_{max}$ and which the vehicle, with the aid of the automatic control system, must absolutely not be allowed to exceed, despite, for example, a simulation finding promising good fuel economy through maximum exploitation of the fact that the downhill slope will soon end and that this is followed by a steep uphill slope, steep enough to brake the vehicle to below $v_{max}$. For safety reasons, the absolute maximum speed should be factory-set.

According to a further embodiment of the invention, the control unit 45 continuously monitors the future topography both during the time the freewheel function is deactivated and when it is activated. The control unit 45 can hence allow the speed v of the vehicle to increase to somewhere between $v_{max}$ and the absolute maximum speed without the freewheel function being deactivated or without the system braking the vehicle with the brake system (or just engine braking), and subject to the control unit 45 having identified that the downhill slope will soon end and that the speed of the vehicle is hence calculated to stay below the absolute maximum speed. Taken as a whole, this can further improve the fuel economy.

Should the device 47 automatically determine the speed $v_{max}$ in dependence on the road gradient for the downhill slope on which the vehicle is found, then the determination of $v_{max}$ can here form part of the continuous simulations, i.e. determination of when the freewheel function is to be deactivated, and then possibly reactivated, is realized continuously and in dependence on the instantaneous state of the vehicle and on future topography.

In the embodiments, account has hitherto only been taken of the road gradient on which the vehicle is traveling. The acceleration and deceleration of the vehicle are also influenced, however, by rolling resistance and air resistance. The road gradient, the rolling resistance and the air resistance, taken together, are commonly referred to as road resistance. In a further embodiment of the invention, the automatic determination of $v_{max}$ and/or the simulations are realized in dependence on the instantaneous and, in some actual embodiments, also future road resistance of the vehicle.

Figure 3:
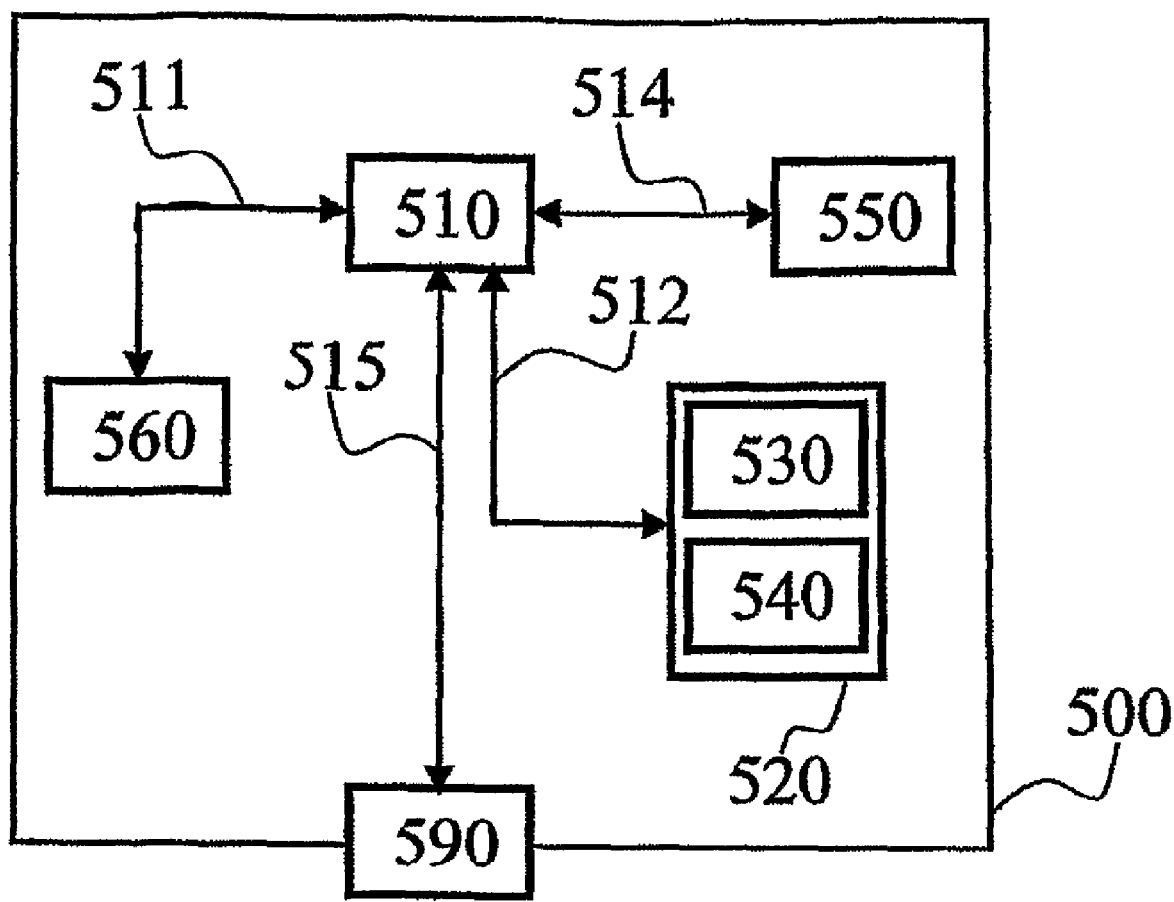
FIG. 3 is a diagrammatic representation of an embodiment of an installation for automatically limiting the speed of a vehicle when freewheeling according to an embodiment of the invention.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the freewheel function according to the invention is stored. In an alternative embodiment, the program for controlling the freewheel function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention should not be deemed to be limited to the illustrative embodiments described above, but rather a number of further variants and modifications are conceivable within the scope of the following patent claims.

What is claimed is:

1. A method for automatic freewheeling of a vehicle, the vehicle comprising speed-lowering means, at least one engine, at least one wheel driven by the engine via an automated stage-geared gearbox, a gas pedal for regulating the driving torque of the engine, the freewheeling being automatically activated in the presence of input signals indicating vehicle speed and gas pedal position within a predetermined swivel angle range of the gas pedal, the swivel angle range starting at a distance from a rest position of the gas pedal and extending over an angle within a total range of swivel of the gas pedal, the method comprising:
   deactivating activated freewheel function when a predetermined vehicle speed limit is exceeded;
   automatically braking the vehicle with the speed-lowering means; and
   reactivating freewheel function once the vehicle speed has fallen to close to equal to the predetermined vehicle speed limit.

2. The method as claimed in claim 1, wherein the vehicle speed limit is predetermined at least in dependence on information on a road gradient for a downhill slope on which the vehicle is traveling.

3. The method as claimed in claim 1, comprising identifying an approaching end of a downhill slope on which the vehicle is traveling and reactivating the freewheel function at a time before the vehicle has fallen below the predetermined vehicle speed limit, wherein the time is at least dependent on when the downhill slope ends.

4. A system for automatic freewheeling of a vehicle, comprising:
   speed-lowering means;
   at least one engine;
   at least one wheel driven by the engine via an automated stage-geared gearbox;
   a gas pedal for regulating the driving torque of the engine; and
   a control unit programmed, in the presence of input signals indicating vehicle speed and gas pedal position within a predetermined swivel angle range of the gas pedal, which predetermined swivel angle range starts at a distance from a rest position of the gas pedal and extends over an angle within a total range of swivel of the gas pedal, to automatically activate a freewheel function, wherein the control unit is arranged to, when the freewheel function is activated and in the presence of an input signal indicating that a predetermined vehicle speed limit is exceeded, to automatically deactivate the freewheel function and brake the vehicle with the speed-lowering means, the control unit being arranged to reactivate the freewheel function in the presence of an input signal indicating that the vehicle speed has fallen to close to the predetermined vehicle speed limit.

5. The system as claimed in claim 4, wherein a device for setting the predetermined vehicle speed limit is coupled to the control unit.

6. The system as claimed in claim 5, wherein the device for setting the predetermined vehicle speed limit is arranged to predetermine the vehicle speed limit in dependence on, at least, information on a road gradient for a downhill slope on which the vehicle is found.

7. The system as claimed in claim 4, wherein the speed-lowering means comprise at least one of a service brake, an auxiliary brake disposed in the vehicle, and internal friction of the engine.

8. A system for automatic freewheeling of a vehicle, comprising:
   speed-lowering means;
   at least one engine;
   at least one wheel driven by the engine via an automated stage-geared gearbox;
   a gas pedal for regulating the driving torque of the engine; and
   a control unit programmed, in the presence of input signals indicating vehicle speed and gas pedal position within a predetermined swivel angle range of the gas pedal, which predetermined swivel angle range starts at a distance from a rest position of the gas pedal and extends over an angle within a total range of swivel of the gas pedal, to automatically activate a freewheel function, wherein the control unit is arranged to, during travel, at least on a basis of information on vehicle speed, road gradient and gas pedal position, to continuously perform data simulations for future progression of the vehicle with a view to optimizing activation and deactivation of the freewheeling with respect to a chosen criterion.

9. The system as claimed in claim 8, wherein the chosen criterion comprises at least one of a demand for increased comfort and reduced fuel consumption.

10. A computer program comprising a program code for executing the method as claimed in claim 1, when the computer program is executed on a computer.

11. A computer program product comprising a program code, stored on a computer-readable medium, for executing the method as claimed in claim 1, when the computer program is executed on the computer.

12. A computer program product directly loadable into an internal memory in a computer, which computer program product comprises a computer program for executing the method as claimed in claim 1, when the computer program on the computer program product is executed on the computer.

* * * * *

UNITED STATES PATENT AND TRADEMARK OFFICE
CERTIFICATE OF CORRECTION

PATENT NO. : 7,223,204 B2
APPLICATION NO. : 11/463601
DATED : May 29, 2007
INVENTOR(S) : Marcus Steen et al.

It is certified that error appears in the above-identified patent and that said Letters Patent is hereby corrected as shown below:

On Page 1, Col. 2, under "References Cited", under "U.S. PATENT DOCUMENTS", insert a line before the line that begins "6,951,525 ..." and insert:
--5,794,170    A    08/1998  Kuroda et al.--.

On Page 1, Col. 2, under "References Cited", after the section entitled "U.S. PATENT DOCUMENTS", after "74/333" begin a new line and insert the following:
-- FOREIGN PATENT DOCUMENTS
WO    02092378    A1    11/2002
FR    2847639    A1    05/2002

OTHER PUBLICATIONS
International Search Report for corresponding International Application PCT/SE2005/000257--.

Signed and Sealed this

Seventh Day of August, 2007

JON W. DUDAS
*Director of the United States Patent and Trademark Office*